W. C. Chamberlain.
Rotary Churn.
Nº 93,174.
Patented Aug. 3, 1869.
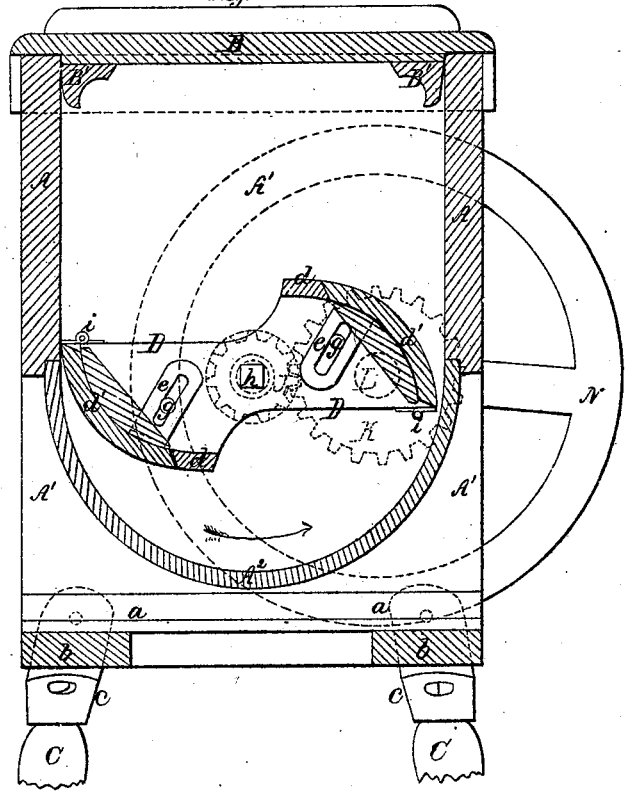
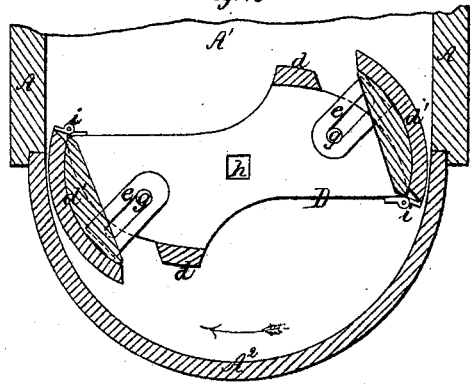
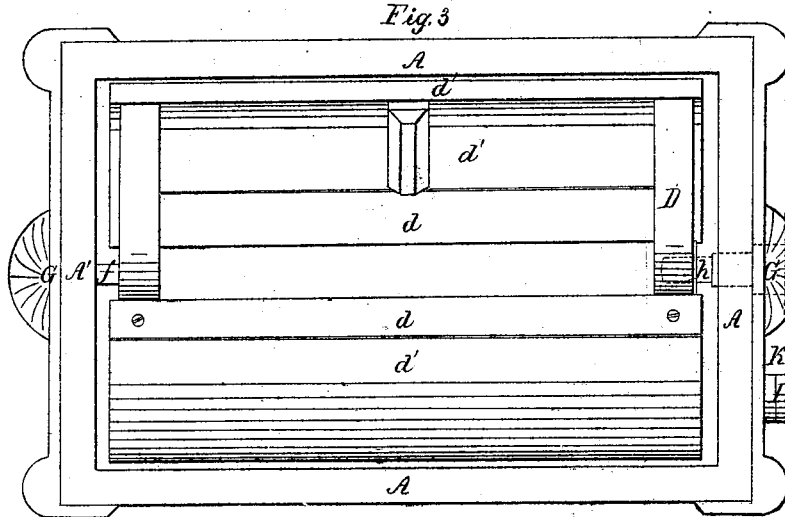
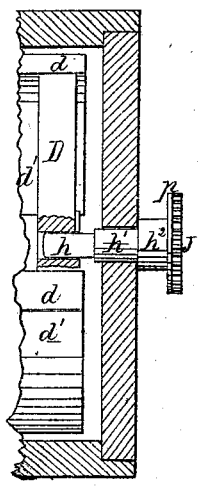
Witnesses
R. T. Campbell
J. N. Campbell
Inventor
W. C. Chamberlain
by
Mason, Fenwick & Lawrence

United States Patent Office.

WILLIAM C. CHAMBERLAIN, OF DUBUQUE, IOWA.

Letters Patent No. 93,174, dated August 3, 1869.

IMPROVEMENT IN CHURNS.

The Schedule referred to in these Letters Patent and making part of the same.

*To all whom it may concern:*

Be it known that I, WILLIAM C. CHAMBERLAIN, of Dubuque, in the county of Dubuque, and State of Iowa, have invented certain new and useful Improvements in Churns; and I do hereby declare that the following is a full, clear, and exact description thereof, reference being had to the accompanying drawings, making a part of this specification, in which—

Figure 1 is a vertical section, taken transversely through the churn, looking toward the balance-wheel and driving-gear, showing the hinged segments of the dash closed, as they appear when in the act of gathering and working the butter.

Figure 2 is a vertical transverse section, through the dash-box and dasher, showing the hinged segments open, as they appear when in the act of churning.

Figure 3 is a top view, with the cover off.

Figure 4 is a horizontal section, through one end of the churn, showing the detachable pinion and its shaft.

Similar letters of reference indicate corresponding parts in the several figures.

This invention relates to a novel improvement on the churn for which Letters Patent of the United States were granted to me, on the 29th day of January, 1867.

In the schedule annexed to the Letters Patent to which I have just referred, I described a churn-dasher of peculiar construction, which was intended for churning when turned in one direction, and for gathering and working the butter when turned in one opposite direction.

In the practical operation of said churn, it has been found that when the crank, which was used for turning the dasher passed the "dead-points," the motion was so irregular and slow that the wings of the dasher would frequently open while working the butter, and thus fail to perform their office as workers and gatherers.

To obviate this objection, the nature of my invention consists in combining with a dasher, which is adapted to serve the double purpose of gathering and working the butter, as well as churning, a balance-wheel and spurred gearing, arranged outside of the churn-box, and so contrived as to allow a regular rotary motion to be given to the dasher, both in churning and in working the butter, as will be hereinafter explained.

To enable others skilled in the art to understand my invention, I will describe its construction and operation.

In the accompanying drawings—

A A represent the vertical sides of the churn-box; $A^1 A^1$, the ends thereof; and $A^2$, its semicircular bottom; which parts are secured together in any suitable manner, and provided with a cover, B, the cleats B' B' of which assist in the production of the butter.

The end pieces $A^1 A^1$ of this churn-box extend beneath the bottom $A^2$, and are connected together by longitudinal strips $b\ b$, the ends of which are firmly rabbeted into the lower ends of the said end pieces, and further strengthened by cleats $a$, fastened to the pieces $A^1$, directly over the strips $b$, as clearly shown in fig. 1.

This churn-box is mounted upon legs C, which have tenons formed on their upper ends, that fit into sockets made in the angle-irons $c$, which latter are securely fastened to the pieces $A^1$, $a$, and $b$, and serve to strengthen these parts at their joints.

The angle-irons G G, with lifting-pieces formed on them, are secured to the ends and sides of the churn-box, and serve to strengthen it at and near its upper end.

Within this box I arrange a rotary dasher, which is so constructed that when it is rotated in the direction indicated by the arrow in fig. 2, it will operate to churn the milk and produce butter in a very rapid manner, and when rotated in the direction indicated by the arrow in fig. 1, it will operate to gather and work the butter.

This dasher is fully described in my Letters Patent above referred to, but I will again describe it, that its operation in conjunction with a balance-wheel may be understood.

It consists of two arms, D D, of the form substantially as shown in the drawings, which are secured, at proper distances apart, to the ends of narrow pieces $d\ d$, whose outer surfaces are curved and have the same radii as the outer surfaces of the hinged wings $d'\ d'$.

These wings $d'\ d'$ are hinged, at $i$, to the curved ends of the arms D D, farthest from the axis of motion of these arms, as shown in the drawings, so that these wings open at points nearest the pieces $d\ d$, and allow the milk to flow through the openings thus made, when the dasher is rotated in the direction indicated in fig. 2. When the dasher is rotated in the opposite direction regularly, the pressure of the liquid and solid substances in the churn will cause the wings $d'\ d'$ to shut, as shown in fig. 1, in which condition their outer surfaces will work and gather the butter into a roll. But to effect this object successfully, the dasher must receive a regular rotary motion, otherwise at certain points in the rotation of said wings their free ends will drop and leave openings, in which the butter will lodge, and thus prevent the wings from acting as workers and gatherers.

To prevent the wings $d'\ d'$ from opening while gathering and working butter, or from closing while churning, I employ a balance-crank wheel, N, of such size and weight as will, when rotated, give a regular motion to the dasher by its momentum overcoming the "dead-points."

This wheel is provided with a handle, and applied upon a short shaft, L, fastened in a suitable manner to one end of the churn-box, and to this wheel a toothed wheel, K, is fastened concentrically, so as to turn with it around shaft, and, by engaging with the teeth of a pinion, J, on a short shaft, $h^1$, give rotary motion to the churn-dasher.

By varying the diameters of the wheels K J, the dasher may be made to rotate several times to one rotation of the balance-wheel.

The pinion J is keyed on the outer end of a short shaft, $h^1$, the inner end of which is prismatic, and is fitted into a socket made in the centre of the dash-arm D nearest it, as shown in fig. 4.

The outer portion $h^2$ of shaft $h^1$ is of greater diameter than this shaft, and forms a shoulder that will close tightly the opening through the churn-box, through which said shaft passes.

The opposite end of the dasher is supported in a bearing formed inside of the churn-box, by a gudgeon, f, whose axis coincides with the axis of $h^1$.

I am aware that it is not new to use a balance-wheel upon churns having rotating dashers, for equalizing the motion of such dashers, and therefore I do not claim, broadly, the application of a balance-wheel to a rotary dasher. Neither do I claim, under this petition, the peculiar construction of the dasher, as it does not materially differ in its construction from the dasher described in my Letters Patent above referred to. Nor do I claim the combination of a balance-wheel and intermediate gearing with stone-breaker jaws, for such a combination is shown and claimed in Blake's reissue patent for a stone-breaking machine; but What I do claim as my invention, and desire to secure by Letters Patent, is—

1. The combination of the churn-dasher D, which has eccentrically-hinged blades $d'$ $d'$, and the balance-driving wheel N, all in such manner as described, that the said eccentrically-hinged wings are caused to positively maintain their proper open and closed positions while churning the milk or cream, and working the butter, as set forth.

2. The churning-arrangement, consisting of the dasher D $d'$, gears J K, and balance-wheel N, as and for the purpose described.

WILLIAM C. CHAMBERLAIN.

Witnesses:
GEO. W. HEALEY,
E. C. DOOLITTLE.